US007936904B2

(12) United States Patent
Furusawa

(10) Patent No.: US 7,936,904 B2
(45) Date of Patent: May 3, 2011

(54) IMAGE RECOGNITION DEVICE FOR VEHICLE AND VEHICLE HEAD LAMP CONTROLLER AND METHOD OF CONTROLLING HEAD LAMPS

(75) Inventor: Isao Furusawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 805 days.

(21) Appl. No.: 11/958,088

(22) Filed: Dec. 17, 2007

(65) Prior Publication Data

US 2008/0205704 A1 Aug. 28, 2008

(30) Foreign Application Priority Data

Feb. 26, 2007 (JP) .................................. 2007-044841

(51) Int. Cl.
*G06K 9/00* (2006.01)
*B60Q 1/00* (2006.01)
(52) U.S. Cl. ........................ 382/104; 382/274; 362/465
(58) Field of Classification Search .................. 382/100, 382/103, 104, 106, 107, 155, 162, 168, 173, 382/181, 189, 190, 194, 199, 201, 232, 254, 382/274, 276, 286–291, 305, 312; 315/291, 315/312; 250/227.25; 362/466, 465
See application file for complete search history.

(56) References Cited

U.S. PATENT DOCUMENTS

| 6,443,603 B1 * | 9/2002 | Eberhardt ..................... 362/465 |
| 6,493,458 B2 * | 12/2002 | Yasui et al. ..................... 382/104 |
| 6,817,740 B2 * | 11/2004 | Kobayashi et al. ........... 362/466 |
| 7,202,613 B2 * | 4/2007 | Morgan et al. ................. 315/312 |
| 7,247,838 B2 * | 7/2007 | Takenaga et al. ......... 250/227.25 |
| 7,512,252 B2 * | 3/2009 | Otsuka et al. ................. 382/104 |
| 7,550,931 B2 * | 6/2009 | Lys et al. ....................... 315/291 |

FOREIGN PATENT DOCUMENTS

| EP | 1 513 103 A2 | 3/2005 |
| JP | 6-276254 A | 9/1994 |
| JP | 2001-138801 A | 5/2001 |
| WO | WO 2004/034183 A2 | 4/2004 |

OTHER PUBLICATIONS

Randall Defauw, et al., "A System for Small Target Detection, Tracking, and Classification", Intelligent Transportation Systems, Oct. 5-8, 1999, pp. 639-644, XP010369949.
European Search Report dated Mar. 20, 2009 (Four (4) pages).

* cited by examiner

*Primary Examiner* — Seyed Azarian
(74) *Attorney, Agent, or Firm* — Crowell & Moring LLP

(57) ABSTRACT

This device includes an input unit for inputting an imaging signal sent from a camera for imaging an area around a vehicle in which the device is loaded, a coordinate area extracting unit for extracting predetermined continuous coordinate areas from the imaging signal inputted by the input unit, a feature quantity calculating unit for calculating a feature quantity of the coordinate areas extracted by the coordinate area extracting unit, a pairing unit for pairing the coordinate areas having the same or closer feature quantities, calculated by the feature quantity calculating unit, the coordinate areas being included in the coordinate areas extracted by the coordinate area extracting unit, with each other, and an output unit for outputting a signal that designates a distance between and a direction of the coordinate areas paired by the pairing unit.

13 Claims, 6 Drawing Sheets

ORIGINAL IMAGE

DIGITAL IMAGE

COMPOSITION 4   COMPOSITION 1

US 7,936,904 B2

IMAGE RECOGNITION DEVICE FOR VEHICLE AND VEHICLE HEAD LAMP CONTROLLER AND METHOD OF CONTROLLING HEAD LAMPS

BACKGROUND OF THE INVENTION

The present invention relates to an image recognition device for a vehicle, a vehicle head lamp controller, and a method of controlling head lamps.

For providing a safer vehicle, there has been developed a technique of automatically changing a light distribution pattern of head lamps mounted in a vehicle according to a condition in which the vehicle is located.

Concretely, there has been known a technique of changing a radiating direction of a low beam outputted from each head lamp according to a steering angle of a steering wheel so as to prompt a driver to more precisely recognize the condition around the vehicle in the vehicle traveling direction. Further, as a technique of prompting a driver to more precisely recognize not the condition around the vehicle mounted with the technique but the condition far off the vehicle in the traveling direction, there has been also known a technique of detecting a light radiating condition in front of a vehicle with a camera and controlling a light distribution pattern such as a high beam or a low beam according to the detected condition. (Refer to JP-A-2001-138801, for example.)

SUMMARY OF THE INVENTION

The prior art is arranged to take the method of detecting light radiation with the camera and determining if another vehicle runs before a vehicle mounted with the prior art or in the opposite direction of the vehicle according to the detected light intensity. In the following description, if a vehicle runs before the vehicle mounted with the prior art or the present invention, it will be called a preceding vehicle and if a vehicle runs in the opposite direction of the vehicle, it will be called an oncoming vehicle. In this method, shines of street lights or neon billboards may be erroneously detected as a preceding or an oncoming vehicle and further the light may be distributed nearby the vehicle though it is necessary to grasp the condition far off the vehicle. Moreover, since this method has difficulty in grasping the location of a preceding or an ongoing vehicle, this method provides a rough controlling capability such as switching off a high beam if a preceding or an oncoming vehicle runs or on a high beam if no preceding or oncoming vehicle comes. This method thus has a disadvantage that the optimal light distribution pattern cannot be realized.

In consideration of the foregoing disadvantage, it is an object of the present invention to provide a device which is arranged to more precisely provide a light distribution pattern according to the location of a preceding or an oncoming vehicle.

According to an aspect of the invention, the device is arranged to take the steps of extracting predetermined continuous coordinate areas from an imaging signal being inputted from a camera for imaging a condition around a vehicle mounted with the device, pairing the coordinate areas having the same or closer feature quantities with each other, outputting a signal that designates the distance between and the direction of the paired coordinate areas, and controlling vehicle head lamps according to the signal.

The device according to the invention makes it possible to more precisely control a light distribution pattern of vehicle head lamps according to the location of a preceding or an oncoming vehicle.

Other objects, features and advantages of the invention will become apparent from the following description of the embodiments of the invention taken in conjunction with the accompanying drawings.

DESCRIPTION OF THE EMBODIMENTS

The embodiments will be described below. As an example, the description will be oriented to the device that is arranged to detect a preceding or an oncoming vehicle at night with a camera and to control a vehicle head lamp according to the detected result. Hereafter, the vehicle mounted with the device according to the invention is simply called the subject vehicle.

First Embodiment

Figure 1:
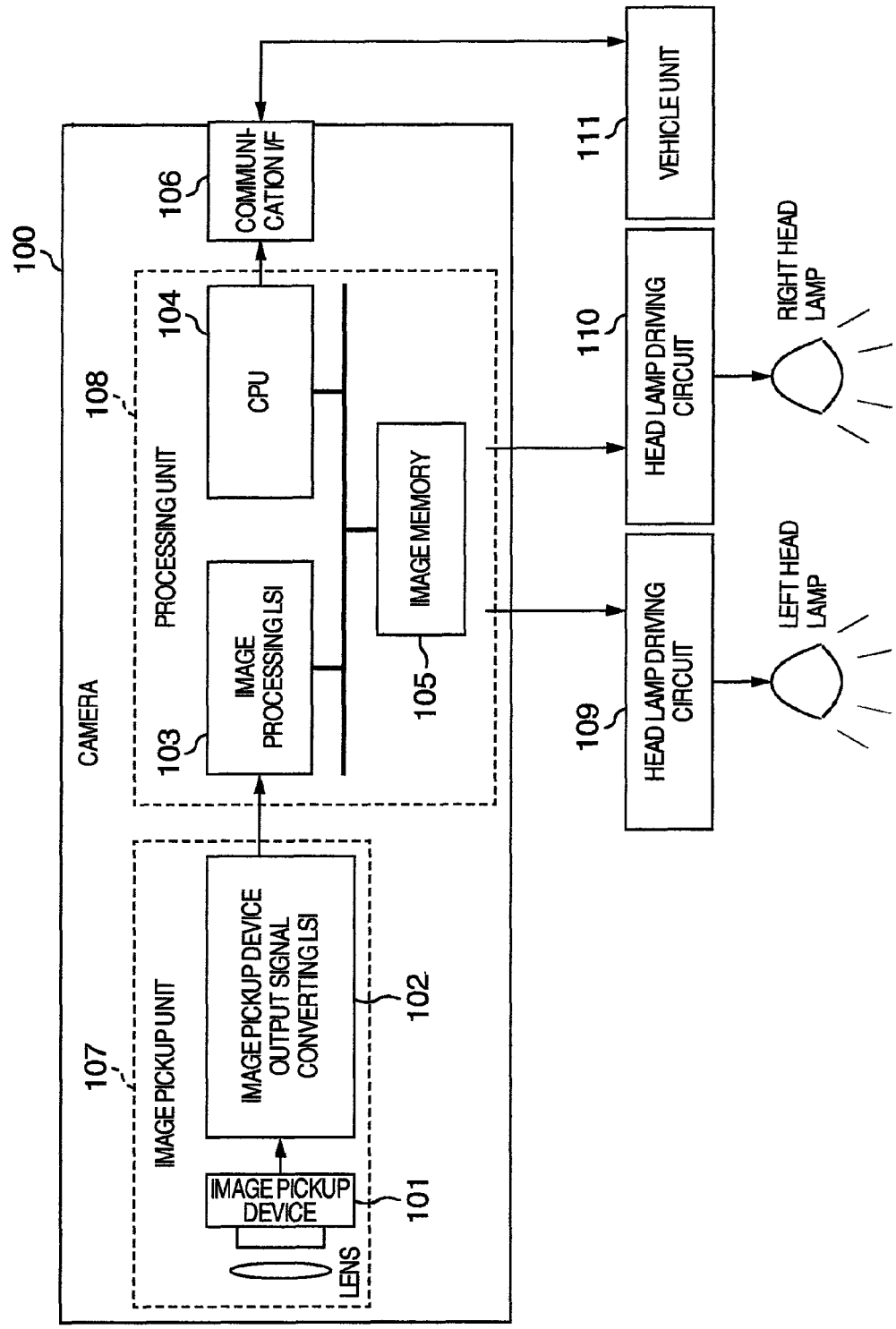
FIG. 1 is a block diagram showing a head lamp controller.

FIG. 1 is a block diagram of a vehicle head lamp controller.

A camera 100 is mounted in a vehicle so that the camera 100 may image the forward condition of the vehicle. The camera 100 is roughly divided into an image pickup unit 107 and a processing unit 108. The image pickup unit 107 includes an image pickup device 101 and an image pickup device output converting LSI 102. The image pickup device 101 has the corresponding number of pixels with the VGA and is operated to pick up an image of an area in the forward direction of the subject vehicle. The converting LSI 102 is operated to convert the analog signal sent from the image pickup device 101 into a digital signal (referred to as the image data) and then to send the image data to the processing unit 108.

The processing unit 108 includes an image processing LSI, a CPU 104 and an image memory 105. The image processing LSI 103 has a function of storing the image data sent from the converting LSI 102 in the image memory 105. The CPU 104 instructs the LSI 103 to process an image if necessary. In response to the instruction from the CPU 104, the LSI 103 performs the image processing (for example, border extracting filtering like Sobel filtering) with respect to the image data stored in the image memory 105 and then stores the processed image in the image memory 105 again. The CPU 104 performs a recognizing process such as recognition of light sources of head lamps based on the processed image stored in the image memory 105. Then, the recognized result is sent to a vehicle unit through a communication I/F 106. Moreover, the processing unit 108 104 calculates a control quantity of head lamps based on the distance between the subject vehicle and a preceding or an oncoming vehicle and sends the control quantity to a head lamp driving circuits 109, 110. The head lamp driving circuits 109, 110 cause a voltage corresponding with the control quantity so that a light axis or a light intensity of the head lamp may be controlled according to the voltage.

In this embodiment, the processing unit 108 is built in the camera 100. However, the present invention is not limited to this arrangement. As another example, the camera 100 may be provided with the image pickup device 107 only and the head lamp driving circuits 109, 110 may be provided with the processing unit 108 so that an image pickup signal may be transferred between the camera 100 and the head lamp driving circuit 107. As another yet example, the processing unit 108 may be built in another vehicle unit, an image pickup signal is obtained from the camera 100 through the communication I/F 106, and the vehicle unit 111 directly outputs a driving signal to the head lamp driving circuits 109, 110.

Figure 9:
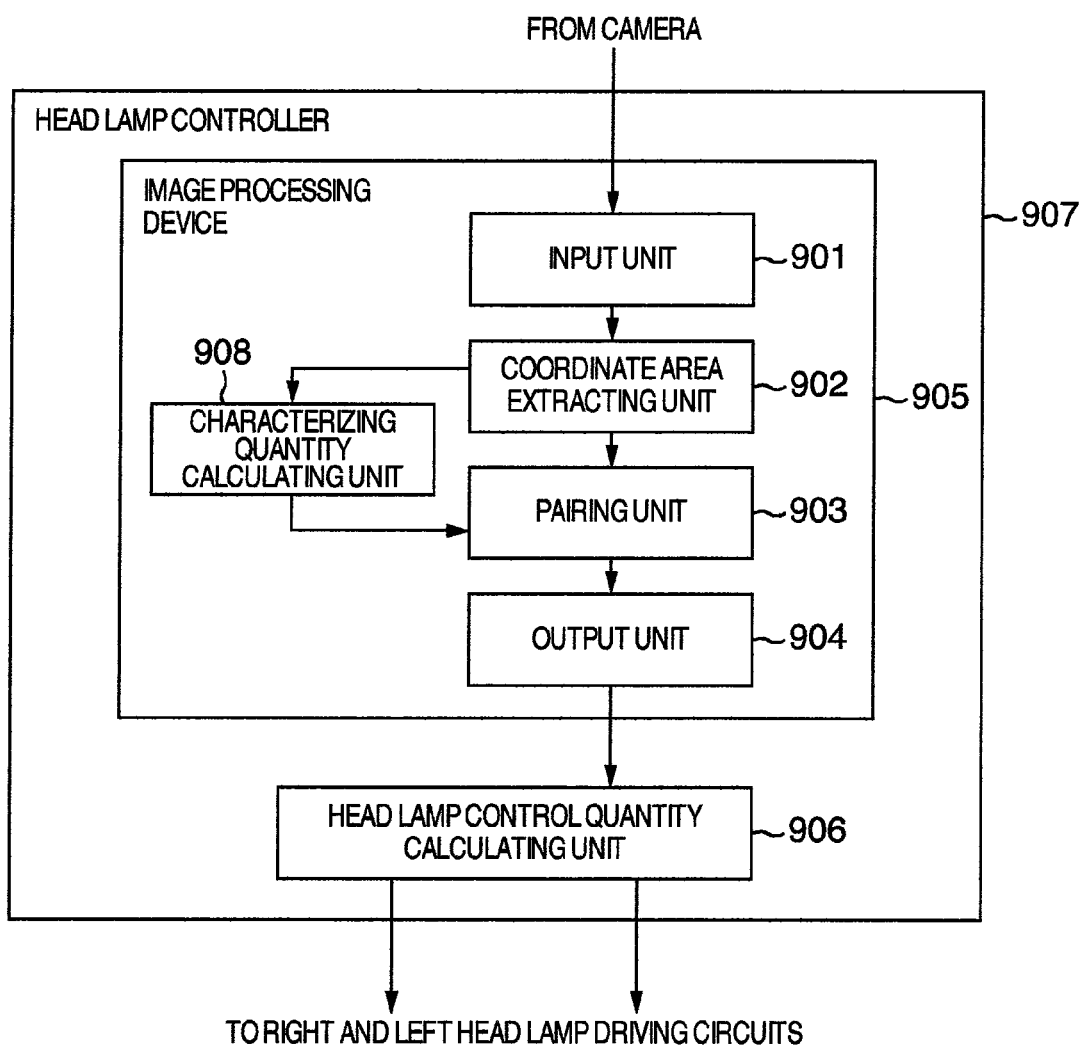
FIG. 9 is a functional block diagram of the head lamp controller shown in FIG. 1.

FIG. 9 is a functional block diagram of the arrangement shown in FIG. 1.

As shown in FIG. 9, a vehicle head lamp controller 907 includes an image processing device 905 and a head lamp control quantity calculating unit 906. The image processing device 905 is arranged to have an input unit 901 for inputting an imaging signal from a camera for imaging the condition around a vehicle, a coordinate area extracting unit 902 for extracting predetermined continuous coordinate areas from the imaging signal inputted in the input unit 901, a feature quantity calculating unit 908 for calculating a feature quantity of the coordinate areas extracted by the extracting unit 902, a pairing unit 903 for pairing the coordinate areas having the same or closer feature quantities calculated in the calculating unit 908 with each other, and an output unit 904 for outputting a signal that designates the distance between and the direction of the paired coordinate areas. Then, the head lamp control quantity calculating unit 906 calculates the control quantity to be sent to the head lamp driving circuit, based on the distance between and the direction of the paired coordinate areas sent from the output unit 904. The input unit 901 or the output unit 904 may be formed of a terminal or a signal line. Further, the input unit 901 or the output unit 904 may be implemented by the input or the output processing to be executed by the software program. The control to be executed by the foregoing components will be described below.

Figure 2:
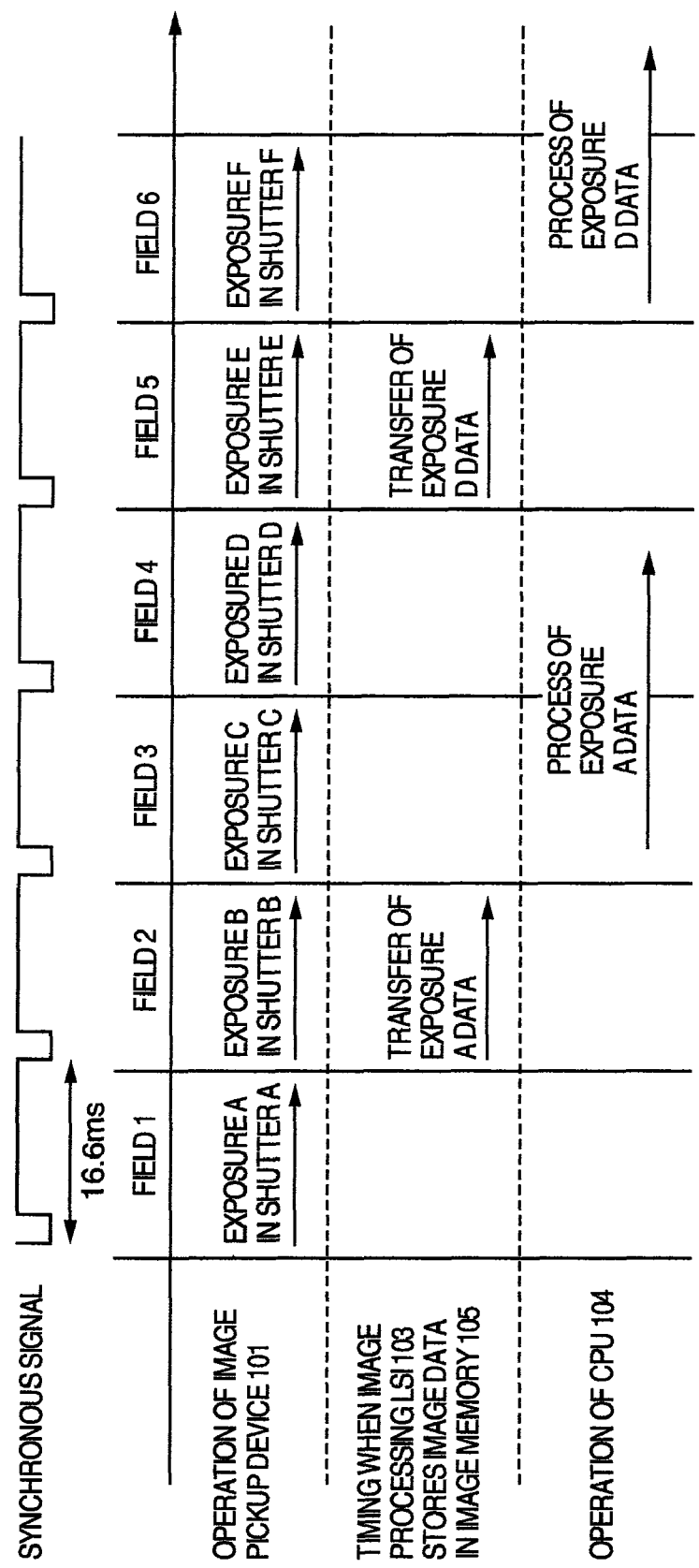
FIG. 2 is a timing chart showing a process from exposure to image processing to be executed in the controller of FIG. 1.

FIG. 2 is a timing chart showing a process from the exposure to the image processing shown in FIG. 1.

In a field 1, an exposure A is carried out by a shutter A in the image pickup device 101. In a field 2, the image processing LSI 103 operates to store in the image memory 105 the image data exposed in the field 1 sent from the image pickup device output converting LSI 102. In a field 3, the CPU 104 instructs the image processing LSI 103 to perform the image processing or the recognition processing with respect to the data stored in the image memory 105.

Figure 3:
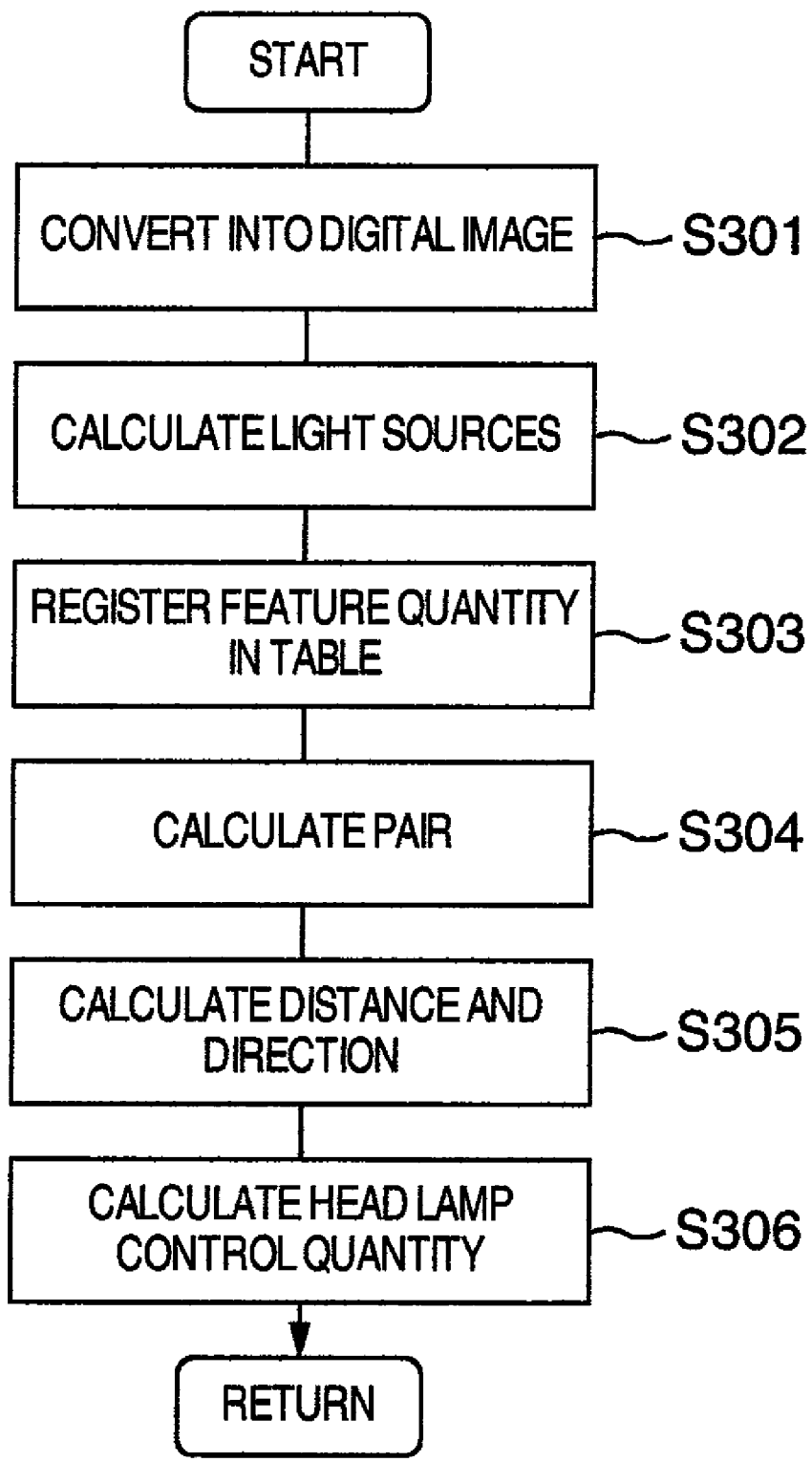
FIG. 3 is a general flowchart showing a process to be executed by the CPU 104 included in the controller of FIG. 1.

FIG. 3 is a general flowchart showing the process to be executed by the CPU 104 shown in FIG. 1.

At first, in a step 301, the CPU 104 issues a digitizing instruction to the image processing LSI 103 so that the original image data stored in the image memory 105 may be converted into the binary image data.

Figure 4A:
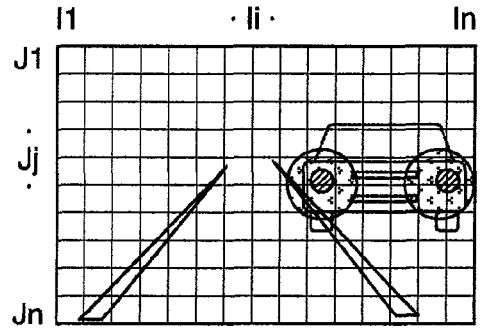
FIG. 4A is a view showing an original image in a step 301 of FIG. 3.
Figure 4B:
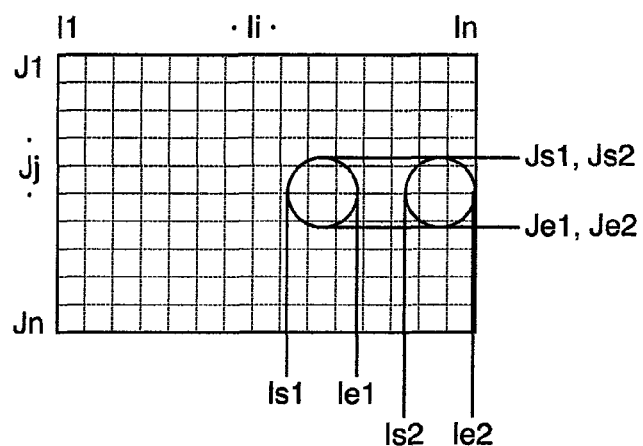
FIG. 4B is a view showing a corresponding digitized image of the original image in FIG. 4A.

FIG. 4 shows the correspondence between the original image and the digitized image in the step 301 of FIG. 3. In each image, an abscissa coordinate is defined as I1 to Ii to In and an ordinate coordinate is defined as J1 to Ji to Jn. In the right hand of the view of the original image are picked up a front portion and head lamps of an oncoming vehicle and illumination of the head lamps. The extensions from the center of the image to the lower left direction and the lower right direction represent traffic lanes on the road (such as white lines or markers). Then, by performing the Sobel filtering operation with respect to the original image and modulating the coefficients, it is possible to obtain the digitized image as shown below. In the central right hand of the digitized image are represented portions corresponding with the illumination of the head lamps. In this portion, circular white areas correspond with the right and the left head lamps of the subject vehicle respectively. In this embodiment, the head lamps of the oncoming vehicle have been referenced as an example. If the tail lamps of a preceding vehicle are referenced, the red areas formed to correspond with the forms of the tail lamps are represented on the digitized image. The following description will be expanded with an example of the head lamps of an oncoming vehicle.

Turning to FIG. 3, in a step S302, the operation like the labeling is carried out so as to calculate the light source. Herein, for example, by scanning the digitized image (which may be replaced with the original image), the coordinates that represent the predetermined color(s) are listed. Then, the operation is executed to extract the predetermined continuous coordinate areas corresponding with the light source and representing the predetermined color (the white of the head lamps, for example) from the list. For example, as to the digitized image shown in FIG. 4, these areas are the foregoing right and left circular white areas. These coordinate areas are regarded as the light sources and then labeled.

In a step S303, for each labeled light source, the feature quantity is calculated. The feature quantity, termed herein, includes any one of a location of a center of gravity, a width, a height, coordinates, an intensity, a color, and a composition of the coordinate area and the corresponding parameter for a way of use is predefined as a feature quantity to be calculated. Then, the calculated feature quantity is stored in a feature quantity table. The parameter "composition" means a number of light sources caused to be active in one head lamp.

Figure 5:
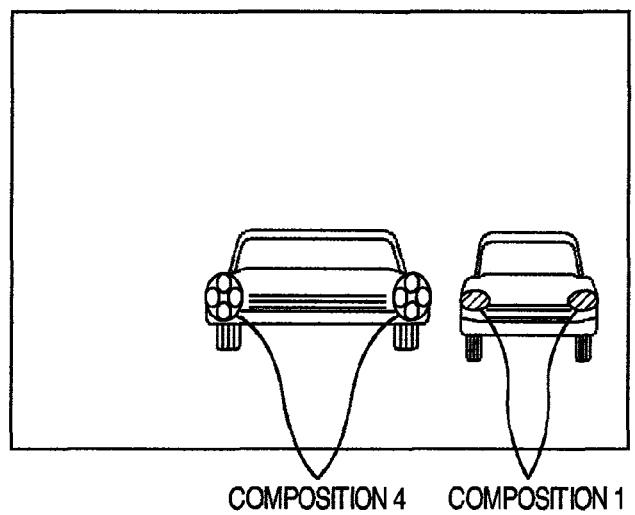
FIG. 5 is a view showing the exemplary number of light sources to be calculated in a step 303 of FIG. 3.

FIG. 5 exemplarily shows the number of light sources calculated in the step 303 of FIG. 3. Considering the halogen lamps of a vehicle shown in the right hand of FIG. 5, one light source is for one halogen lamp. Considering the LED lamps of a vehicle shown in the left hand of FIG. 5, plural light sources are for one LED lamp.

Turning back to FIG. 3, in a step 304, the stored pair of the head lamps or the tail lamps is calculated. The search is carried out horizontally. Then, it is determined that the light sources having the same feature parameter or the closer feature parameters are paired.

Then, in a step S305, the vehicle having the paired light sources is specified on the basis of the determined paired light sources and then the distance between the vehicle and the subject vehicle and the direction of the vehicle are determined. The distance can be calculated on the width between the paired light sources by the existing technique. The direction can be determined by calculating the centers of gravity of the paired light sources and specifying the direction of the vehicle from the coordinates of the centers of gravity.

In a step 306, the location of the vehicle with respect to the subject vehicle is grasped from the calculated distance and direction. The longest illuminating distance and the widest direction that do not dazzle a driver of the preceding or the oncoming vehicle are determined from the grasped vehicle location. The control quantities of the right and the left head lamps are independently calculated according to the determined distance and direction. The signal representing the calculated control quantity is sent to the head lamp driving circuits 109, 110.

As described above, by specifying the light sources of the preceding or the oncoming vehicle based on the picked-up image and pairing them with each other, it is possible to suppress erroneous detection of the light sources not to be paired such as shines of street lights or neon billboards and thereby more precisely control the light distribution patterns of the head lamps.

Second Embodiment

In the foregoing first embodiment, the features of the head lamps include the location of the center of gravity, the width, the coordinates, the intensity, the color, and the composition. In actual, however, as to the head lamps of an oncoming vehicle or the tail lamps of a preceding vehicle, these features can be calculated by the imaging processing, while as to another vehicle coming from a long distance, it is difficult to calculate the features of the width, the height and the composition by means of the image processing. Hence, as to the vehicle coming from a long distance, the second embodiment offers a method of accurately searching a pair of head lamps or tail lamps of the vehicle coming from a long distance.

Figure 6:
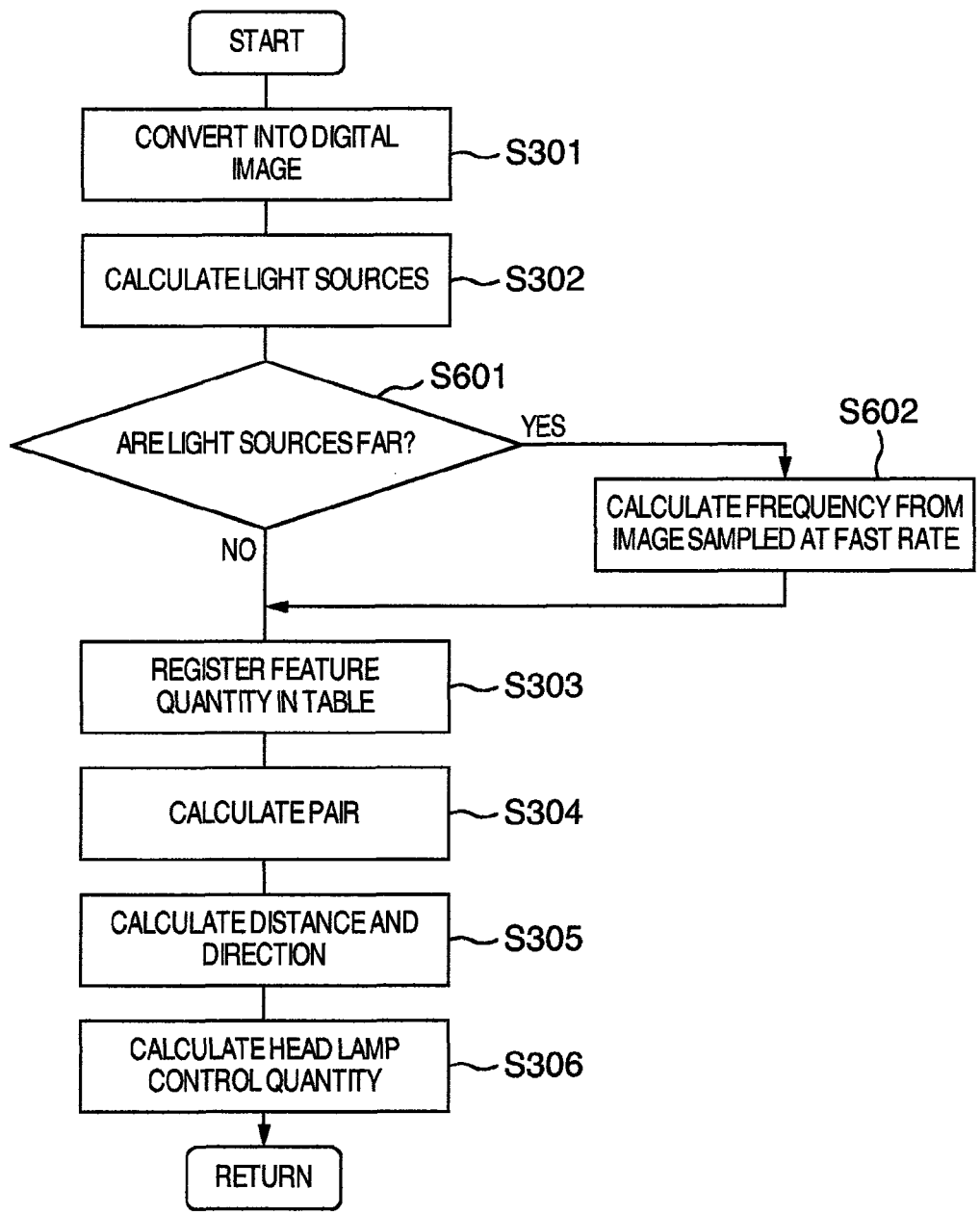
FIG. 6 is a general flowchart of a head lamp controller.

FIG. 6 is a general flowchart of the method according to the second embodiment.

The process up to the step of calculating the light sources of the second embodiment is the same as that of the first embodiment. In the second embodiment, it is determined that the light sources are located near or far off the subject vehicle based on the intensity, the width and the height of the light sources. In a step 601, if the intensity is weak and the width and the height are small, it is determined that the light sources are located far off the subject vehicle. If they are contrary, it is determined that the light sources are located near the subject vehicle. If the light sources are located far off the subject vehicle, the process goes to a step 602.

Figure 7:
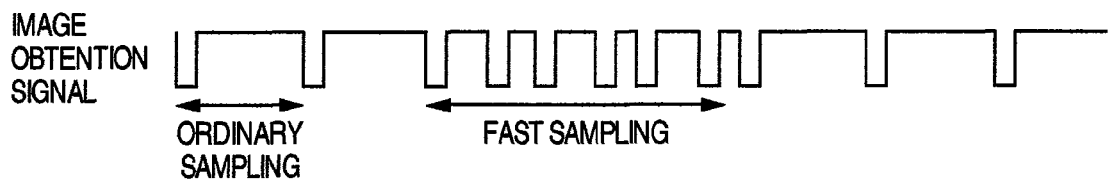
FIG. 7 is a chart showing an exemplary fast sampling timing to be used in the process of FIG. 6.

FIG. 7 shows a fast sampling timing to be used in the process shown in FIG. 6.

If the light sources are the LED head lamps, the light sources are often made active by the ON/OFF control. In this case, as shown in FIG. 7, a fast sampling interval is put between the general samplings (the interval of which is usually ⅟60s) and then the frequency of the light sources is calculated from the image sampled at the fast sampling rate. Though the overall image on the screen may be sampled at the fast sampling rate, to make the reading of the image faster, the fast sampling may be applied to only a portion of the image on the screen.

Figure 8:
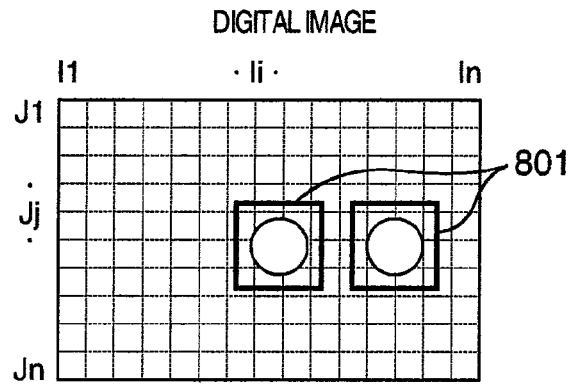
FIG. 8 is a view showing a process of reading images at the fast sampling to be executed in the process of FIG. 6.

FIG. 8 shows the method of reading the image to be sampled at the fast sampling rate as indicated in the operation shown in FIG. 6.

Considering that the light sources are moving, as shown in FIG. 8, the target image is restricted to the images around the light sources. Further, the image may be read by changing the sampling period. For example, it is assumed that the image is read at the A sampling period, the B sampling period and the C sampling period. By detecting the light sources calculated at respective sampling periods such as the light sources enabled to be calculated by the A sampling period, the light sources enabled to be calculated by the B sampling period and the light sources enabled to be calculated by the C sampling period, the pair of light sources may be calculated. This results in eliminating the process of analyzing the frequencies of the images of the areas around the light sources after the fast sampling.

In this embodiment, as listed in Table 1, the features of "the location of the center of gravity, the width, the height, the coordinates, the intensity, the color and the composition" are used for the light sources of another vehicle located near the subject vehicle, while the features of "the color, the frequency, the coordinates and the intensity" are used for the light sources of another vehicle located far off the subject vehicle. This proper switch of the features depending on if another vehicle coming to the subject vehicle is located near or far off the subject vehicle makes it possible to accurately calculate the pair of light sources of the head lamps of the oncoming vehicle or the tail lamps of the preceding vehicle.

TABLE 1

| Distance from Subject Vehicle | Feature Quantity of Light Sources |
| --- | --- |
| Near | Location of center of gravity, width, height, coordinate, intensity, color, composition |
| Far | Color, frequency, coordinates, intensity |

As described above, the second embodiment is arranged to read only the images of the areas around the light sources in the process, so that the fast sampling is made possible.

Further, by calculating the pair of light sources as changing the sampling periods, it is possible to eliminate the process of analyzing the frequencies of the images of the areas around the light sources after the fast sampling.

Since the fast sampling is carried out, it is possible to exclude the light sources of the existing frequencies such as street lights and LED signals from the sampling. Hence, as to the head lamps of an oncoming vehicle or the tail lamps of a preceding vehicle, the pair of the light sources can be calculated with high precision.

Further, the pair of the head lamps or the tail lamps can be calculated with high precision. Hence, the width and the center of gravity of the pair can be also calculated with high precision.

Then, the distance between the subject vehicle and the preceding or the oncoming vehicle is calculated on the width and the direction of the preceding or the oncoming vehicle is calculated on the location of a center of gravity. Hence, the control quantity of the head lamps of the subject vehicle can be continuously calculated according to the calculated distance and direction.

As described above, in the head lamp controller that is arranged to change a direction of a light axis and an intensity of light of the head lamps according to the location of an preceding or an oncoming vehicle, the controller uses the features of "a location of center of gravity, a width, a heighten, coordinates, an intensity, a color and a composition" for the light sources located closer to the subject vehicle or the features of "a color, a frequency, coordinates and an intensity" for the light sources located far off the subject vehicle. This switching of the features makes it possible to precisely calculate the pair of light sources of the head lamps of an oncoming vehicle or the tail lamps of a preceding vehicle.

In particular, it is difficult to recognize the form of the light sources of the head lamps or the tail lamps of another vehicle located far off the subject vehicle. In this embodiment, hence, the fast sampling is used for calculating the frequency of the head lamps or the tail lamps. The pair of the light lamps is calculated on the frequency. This makes it possible to recognize the pair of the head lamps or the tail lamps of another vehicle located far off the subject vehicle.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing device for a vehicle comprising:
an input unit for inputting an imaging signal sent from a camera for imaging an area around a vehicle;
a coordinate area extracting unit for extracting predetermined continuous coordinate areas from the imaging signal inputted by the input unit;
a feature quantity calculating unit for calculating feature quantities of the coordinate areas extracted by the coordinate area extracting unit;
a pairing unit for pairing the coordinate areas having the same or closer feature quantities calculated by the feature quantity calculating unit, the coordinate areas being included in the coordinate areas extracted by the coordinate area extracting unit, with each other; and
an output unit for outputting a signal that designates a distance between and a direction of the coordinate areas paired by the pairing unit;
wherein the image to be inputted by the input unit is an image inputted as changing the sampling period.

2. The image processing device for a vehicle as claimed in claim 1, wherein the coordinate area extracting unit digitizes the imaging signal inputted by the input unit, determines that the continuous coordinate areas having the same value are light sources based on the digitized result, and extracts the continuous coordinate areas.

3. The image processing device for a vehicle as claimed in claim 1, wherein the feature quantity calculating unit calculates one of a location of center of gravity, a width, a height, coordinates, an intensity, a color and a composition of the coordinate area extracted by the coordinate area extracting unit.

4. The image processing device for a vehicle as claimed in claim 1, wherein the input unit includes an image sampled at a faster sampling rate than an ordinary one.

5. The image processing device for a vehicle as claimed in claim 4, wherein the sampled image is an image restricted to the area around a light source.

6. The image processing device for a vehicle as claimed in claim 1, wherein the pairing unit excludes light sources of existing frequencies other than vehicle light sources and then performs the pairing of the coordinate areas.

7. A vehicle head lamp controller comprising:
an input unit for inputting an imaging signal sent from a camera for imaging an area around a vehicle;
a coordinate area extracting unit for extracting predetermined continuous coordinate areas from the imaging signal inputted by the input unit;
a feature quantity calculating unit for calculating feature quantities of the coordinate areas extracted by the coordinate area extracting unit;
a pairing unit for pairing the coordinate areas having the same or closer feature quantities calculated by the feature quantity calculating unit, the coordinate areas being included in the coordinate areas extracted by the coordinate area extracting unit, with each other; and
an output unit for outputting a signal that designates a distance between and a direction of the coordinate areas paired by the pairing unit; and
a head lamp control quantity calculating unit for calculating a control quantity to be sent to a head lamp driving circuit based on a distance between and a direction of the coordinate areas obtained by the output unit;
wherein the image to be inputted by the input unit is an image inputted as changing the sampling period.

8. The head lamp controller as claimed in claim 7, wherein the coordinate area extracting unit digitizes the imaging signal inputted by the input unit, determines that the continuous coordinate areas having the same value are light sources based on the digitized result, and extracts the continuous coordinate areas.

9. The head lamp controller as claimed in claim 7, wherein the feature quantity calculating unit calculates one of a location of center of gravity, a width, a height, coordinates, an intensity, a color and a composition of the coordinate area extracted by the coordinate area extracting unit.

10. The head lamp controller as claimed in claim 7, wherein the input unit includes as an input signal an image sampled at a faster sampling rate than an ordinary one.

11. The head lamp controller as claimed in claim 10, wherein the sampled image is an image restricted to the area around a light source.

12. The head lamp controller as claimed in claim 7, wherein the pairing unit excludes light sources of existing frequencies other than vehicle light sources and then performs the pairing of the coordinate areas.

13. A method of controlling head lamps comprising the steps of:
inputting an imaging signal from a camera for imaging an area around a vehicle;
calculating predetermined continuous coordinate areas from the inputted imaging signal;
calculating feature quantities of the extracted coordinate areas;
pairing the coordinate areas having the same or closer feature quantities, the coordinate areas being included in the extracted coordinate areas, with each other; and
controlling light distribution of the vehicle head lamps based on a distance between and a direction of the coordinate areas paired with each other;
wherein the image to be inputted by the input unit is an image inputted as changing the sampling period.

* * * * *